United States Patent
Aldana et al.

(10) Patent No.: US 8,545,247 B2
(45) Date of Patent: Oct. 1, 2013

(54) DOCK FOR A PORTABLE ELECTRONIC DEVICE

(75) Inventors: Leonardo Aldana, Waterloo (CA);
Ming-Lun Dave Ma, Kitchener (CA);
Dietmar Frank Wennemer, St. Agatha (CA); Felipe Oliveira Simoes, Kitchener (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/397,486

(22) Filed: Feb. 15, 2012

(65) Prior Publication Data

US 2013/0005179 A1 Jan. 3, 2013

Related U.S. Application Data

(60) Provisional application No. 61/503,451, filed on Jun. 30, 2011.

(51) Int. Cl.
*H01R 13/64* (2006.01)

(52) U.S. Cl.
USPC .......................................... 439/248; 439/929

(58) Field of Classification Search
USPC .......................................... 439/246–248, 929
See application file for complete search history.

(56) References Cited

U.S. PATENT DOCUMENTS

| | | | | |
|---|---|---|---|---|
| 4,940,417 A * | 7/1990 | Hyogo et al. | | 439/248 |
| 5,513,995 A * | 5/1996 | Kurotori et al. | | 439/64 |
| 6,193,546 B1 * | 2/2001 | Sadler | | 439/534 |
| 6,290,534 B1 * | 9/2001 | Sadler | | 439/534 |
| 6,390,841 B1 * | 5/2002 | Zaguskin | | 439/248 |
| 6,483,698 B1 * | 11/2002 | Loh | | 361/679.41 |
| 6,527,572 B2 * | 3/2003 | Jou | | 439/248 |
| 6,595,786 B2 * | 7/2003 | Horiuchi et al. | | 439/74 |
| 6,716,058 B2 * | 4/2004 | Youn | | 439/535 |
| 7,014,486 B1 * | 3/2006 | Wu et al. | | 439/248 |
| 7,066,752 B2 * | 6/2006 | Hsu et al. | | 439/248 |
| 7,090,521 B2 * | 8/2006 | Nishio et al. | | 439/248 |
| 7,121,857 B1 * | 10/2006 | Lewis | | 439/247 |
| 7,167,372 B2 * | 1/2007 | Mori et al. | | 361/731 |
| 7,201,594 B2 * | 4/2007 | van der Mee et al. | | 439/247 |
| 7,311,541 B2 * | 12/2007 | Chien et al. | | 439/246 |
| 7,467,961 B2 * | 12/2008 | Kuo | | 439/248 |
| 7,498,546 B2 | 3/2009 | Belongia et al. | | |
| 7,553,192 B2 * | 6/2009 | Kuo et al. | | 439/638 |

(Continued)

FOREIGN PATENT DOCUMENTS

DE 202010013105 U1 4/2011

OTHER PUBLICATIONS

Extended European Search Report dated Aug. 22, 2012, issued from the corresponding EP patent application No. 12155508.0.
US 8,449,336, 05/2013, Colahan et al. (withdrawn)

*Primary Examiner* — Ross Gushi
(74) *Attorney, Agent, or Firm* — Lesley M. Morrison; Borden Ladner Gervais LLP

(57) ABSTRACT

A dock for receiving a portable electronic device, including a housing comprising an aperture; a support coupled to an inner wall of the housing, a portion of the support being elastically deformable; and a connector received in the support and extending through the aperture for electrically communicating with the portable electronic device, wiring of the connector for transferring data to an electronic device; wherein the portion of the support elastically deforms in response to non-axial movement of at least a portion of the connector.

19 Claims, 16 Drawing Sheets

(56) References Cited

U.S. PATENT DOCUMENTS

| | | | |
|---|---|---|---|
| 7,628,628 B2* | 12/2009 | Matsuda et al. | 439/248 |
| 7,775,801 B2 | 8/2010 | Shiff et al. | |
| 7,839,120 B2 | 11/2010 | Rodarte | |
| 7,901,216 B2 | 3/2011 | Rohrbach et al. | |
| 7,916,467 B2* | 3/2011 | Hotelling et al. | 361/679.41 |
| 7,931,494 B2* | 4/2011 | Long | 439/527 |
| 7,933,117 B2* | 4/2011 | Howarth et al. | 361/679.41 |
| 8,068,336 B2* | 11/2011 | Crooijmans et al. | 361/679.41 |
| 8,083,195 B2* | 12/2011 | Osada | 248/274.1 |
| 8,113,849 B2* | 2/2012 | Park, IV | 439/34 |
| 8,113,873 B1* | 2/2012 | Sarraf | 439/533 |
| 8,152,561 B2* | 4/2012 | Long | 439/527 |
| 8,223,483 B2* | 7/2012 | Hayashida et al. | 361/679.41 |
| 8,241,050 B2* | 8/2012 | Xu et al. | 439/247 |
| 8,323,040 B2* | 12/2012 | Prest | 439/131 |
| 8,366,468 B2* | 2/2013 | Carnevali | 439/248 |
| 8,366,469 B2* | 2/2013 | Carnevali | 439/248 |
| 2002/0048982 A1* | 4/2002 | Gu et al. | 439/247 |
| 2006/0035500 A1* | 2/2006 | Sugita et al. | 439/247 |
| 2006/0105603 A1* | 5/2006 | Nishio et al. | 439/247 |
| 2006/0141836 A1* | 6/2006 | Van Der Mee et al. | 439/247 |
| 2006/0250764 A1* | 11/2006 | Howarth et al. | 361/683 |
| 2007/0082537 A1* | 4/2007 | Chien et al. | 439/377 |
| 2008/0057764 A1* | 3/2008 | Kuo | 439/248 |
| 2008/0142651 A1* | 6/2008 | Tomasini et al. | 248/176.1 |
| 2008/0259550 A1* | 10/2008 | Lien | 361/683 |
| 2008/0304240 A1* | 12/2008 | Shigemori | 361/728 |
| 2009/0009957 A1* | 1/2009 | Crooijmans et al. | 361/686 |
| 2009/0068870 A1* | 3/2009 | Mezhinsky | 439/247 |
| 2010/0062615 A1* | 3/2010 | Prest | 439/38 |
| 2010/0158297 A1* | 6/2010 | Stuczynski | 381/332 |
| 2011/0098087 A1* | 4/2011 | Tseng | 455/557 |
| 2011/0117833 A1* | 5/2011 | Hong et al. | 455/3.06 |
| 2011/0281451 A1* | 11/2011 | Tanis et al. | 439/248 |
| 2012/0045931 A1* | 2/2012 | Carnevali | 439/544 |
| 2012/0045932 A1* | 2/2012 | Carnevali | 439/552 |
| 2012/0206875 A1* | 8/2012 | Carnevali | 361/679.41 |
| 2013/0002193 A1* | 1/2013 | Aldana et al. | 320/107 |
| 2013/0005179 A1* | 1/2013 | Aldana et al. | 439/529 |

* cited by examiner

DOCK FOR A PORTABLE ELECTRONIC DEVICE

CROSS REFERENCE TO RELATED APPLICATIONS

The present application claims the benefit of priority of U.S. Provisional Patent Application No. 61/503,451, filed on Jun. 30, 2011, which incorporated herein by reference in its entirety.

TECHNICAL FIELD

The present application relates to charging and/or data transfer docks for portable electronic devices.

BACKGROUND DISCUSSION

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), tablets and laptop computers with wireless 802.11 or Bluetooth capabilities.

Portable electronic devices such as PDAs or smart telephones are generally intended for handheld use (that is, the devices are sized and shaped to be held or carried in a human hand) and ease of portability. Portable electronic devices are often placed in docks for charging or data transfer including transfer of information in any form optically or electrically from dock to portable electronic device and vice versa. Some docks are capable of both charging and data transfer. Docks and portable electronic devices are susceptible to damage due to connection attempts when the portable electronic device and the dock are not properly aligned.

BRIEF DESCRIPTION OF THE DRAWINGS

Embodiments of the present application will now be described, by way of example only, with reference to the attached Figures, wherein.

DETAILED DESCRIPTION

Figure 1:
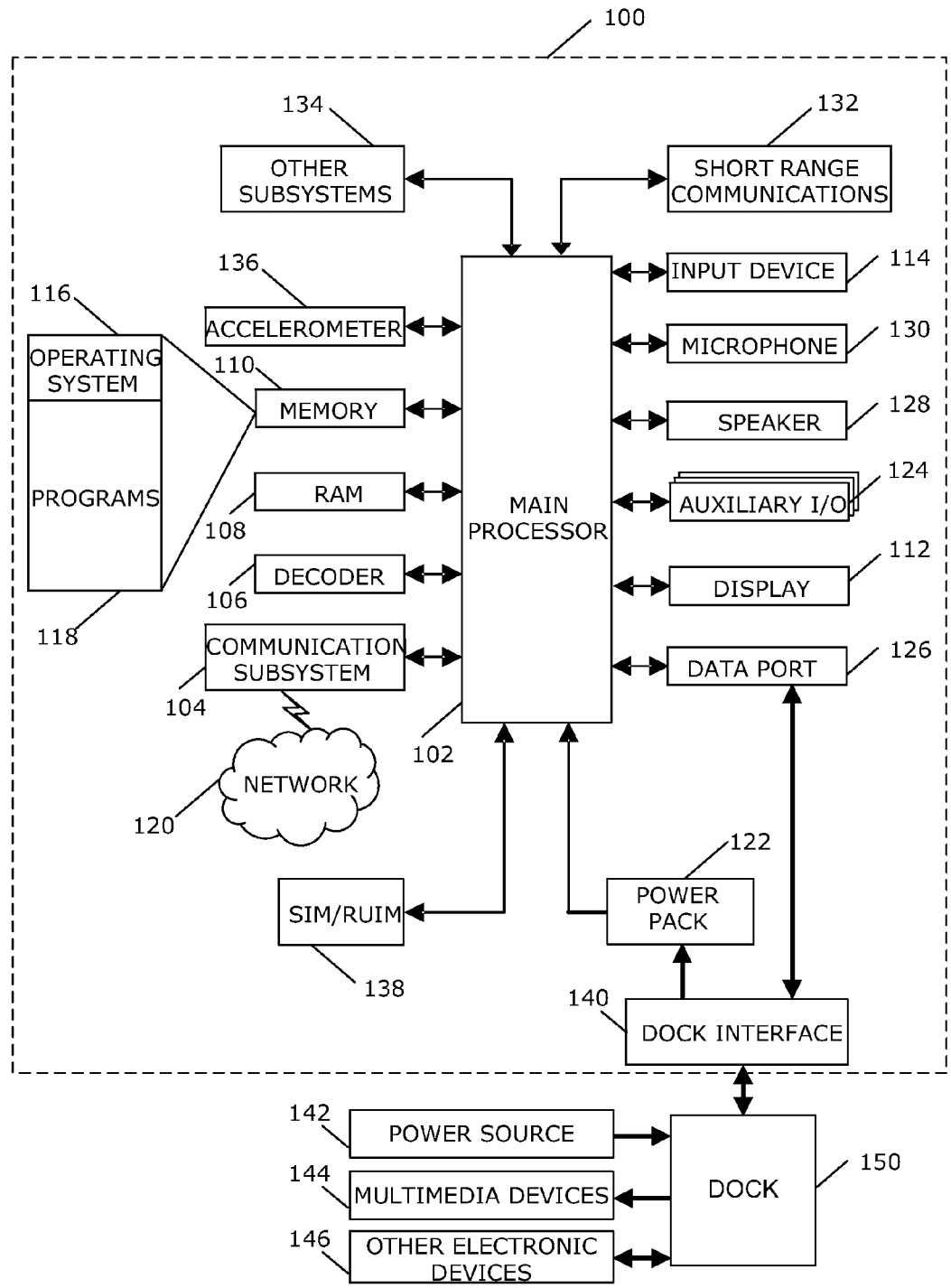
FIG. 1 is a simplified block diagram of components including internal components of a portable electronic device.

The following describes a dock for receiving a portable electronic device. The dock includes a support for a connector including an elastically deformable portion for allowing movement of the connector relative to the dock when a force is applied.

In an aspect of the present disclosure, there is provided a dock for receiving a portable electronic device, including: a housing comprising an aperture; a support coupled to an inner wall of the housing, a portion of the support being elastically deformable; and a connector received in the support and extending through the aperture for electrically communicating with the portable electronic device, wiring of the connector for transferring data from the portable electronic device; wherein the portion of the support elastically deforms in response to non-axial movement of at least a portion of the connector.

In another aspect of the present disclosure, there is provided a connector assembly for a dock, the connector assembly including: a support for coupling to an inner wall the dock, a portion of the support being elastically deformable; and a connector received in the support and extending through the aperture for electrically communicating with the portable electronic device, wiring of the connector for transferring data from the portable electronic device; wherein the portion of the support elastically deforms in response to non-axial movement of at least a portion of the connector.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to a dock for a portable electronic device in the embodiments described herein. The dock may receive portable electronic devices including: mobile, or handheld, wireless communication devices such as pagers, cellular phones, cellular smart-phones, wireless organizers, tablets, global positioning system devices and personal digital assistants, for example. The portable electronic device may also be a portable electronic device without wireless communication capabilities, such as a handheld electronic game device, digital photograph album, digital camera, or other device. The portable electronic device may be, but need not be, a handheld device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 120. The wireless network 120 may be any type of wireless network, including, but not limited to, data wireless networks, voice wireless networks, and networks that support both voice and data communications.

A power pack 122, such as one or more rechargeable batteries or a port to an external power supply, powers the portable electronic device 100. A dock interface 140 may electrically communicate with a dock 150 to charge the power pack 122 and/or provide a data connection to a data port 126 of the portable electronic device 100. In general, components electrically communicate with one another when the electrical activity in one component affects an electrical activity in another. Electrical communication includes direct electrical contact that enables current flow. The dock interface 140 may include one or more mating connectors for electrically communicating with connectors of the dock 150. The dock 150 may electrically communicate with one or more of a power source 142, multimedia devices 144 such as televisions, monitors, projectors or other output devices, for example, and other electronic devices 146. In some situations, communication may be electrical or optical or a combination of electrical and optical.

The processor 102 interacts with other components, such as Random Access Memory (RAM) 108, memory 110, a display 112, an input device 114, an auxiliary input/output (I/O) subsystem 124, a data port 126, a speaker 128, a microphone 130, short-range communications 132, and other device subsystems 134. The processor 102 may interact with an orientation sensor such as an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 120. Alternatively, user identification information may be programmed into memory 110.

The portable electronic device 100 includes an operating system 116 and software programs or components 118 that are executed by the processor 102 and are typically stored in a persistent, updatable store such as the memory 110. Additional applications or programs may be loaded onto the portable electronic device 100 through the wireless network 120, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 120 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
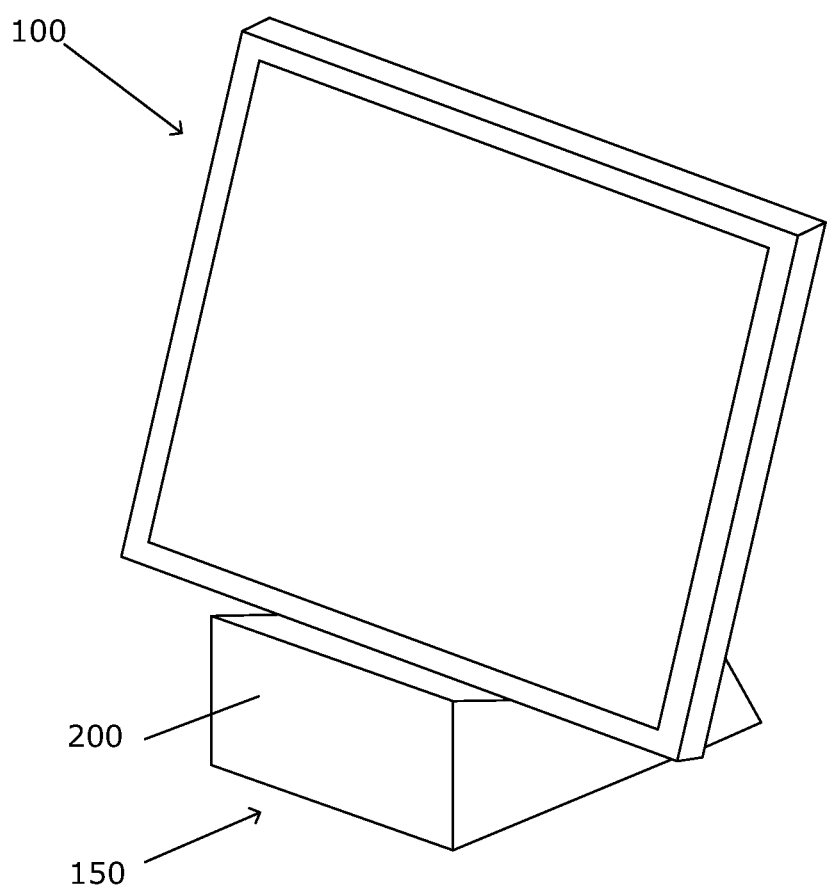
FIG. 2 is an isometric view of a portable electronic device received in a dock according to an example.
Figure 3:
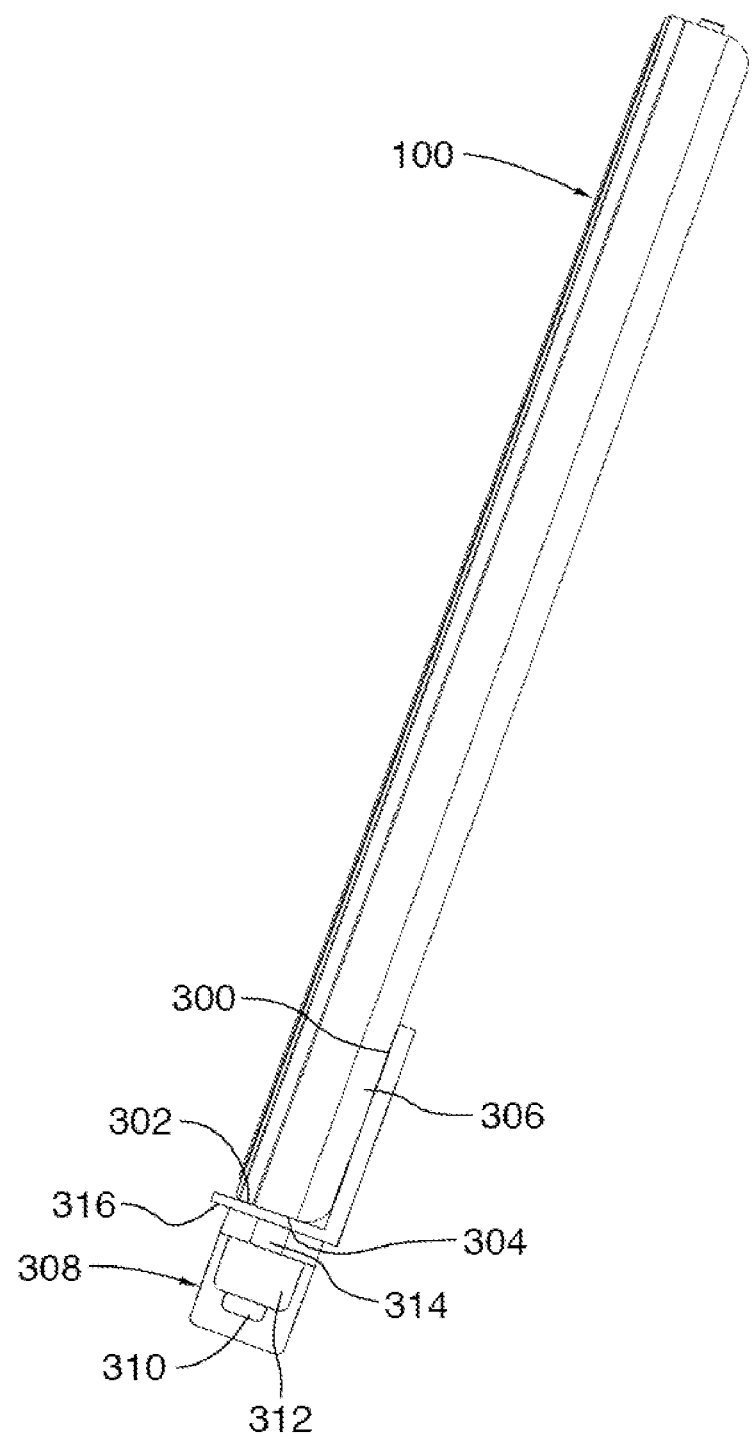
FIG. 3 is a side view of a portable electronic device received in the dock of FIG. 2 with a portion of a housing of the dock removed.

An example dock 150 for receiving a portable electronic device 100 is shown in FIGS. 2 and 3. The dock 150 includes a housing 200 that is shaped to receive the portable electronic device 100. In one example, the housing 200 includes a seat 302 and a support wall 300 for receiving the portable electronic device 100. In general, the support wall 300 and the seat 302 support the weight of a received portable electronic device 100, although in some of the embodiments depicted herein, the seat 302 may support more weight than the support wall 300. As shown in FIG. 3, an edge surface 304 of the portable electronic device 100 contacts the seat 302 of the housing 200 and a rear surface 306 of the portable electronic device 100 contacts the support wall 300 of the housing 200. The size and shape of the seat 302 and the support wall 300 and the angle between the seat 302 and the support wall 300 may be selected to accommodate different sizes and types of portable electronic devices 100.

The housing 200 may be molded plastic, machined metal or wood, for example. The housing may be a single part or may be an assembly of multiple parts.

The dock 150 includes a connector support assembly 308 that is coupled to an inner surface of the housing 200. In general, components are coupled to one another when movement of one component affects movement in the other component. Coupling may be permanent, such as by welding for example, or may be reversible, such as connection by fasteners, for example. Coupling may include direct contact between the two components or the components may be spaced from one another with additional components being provided to achieve coupling between the two components. In one example, screws 310 couple lugs 312 of the support assembly 308 to screw-receiving components 314, which extend from an underside surface 316 of the seat 302, to couple the support assembly 308 to the housing 200.

Figure 4:
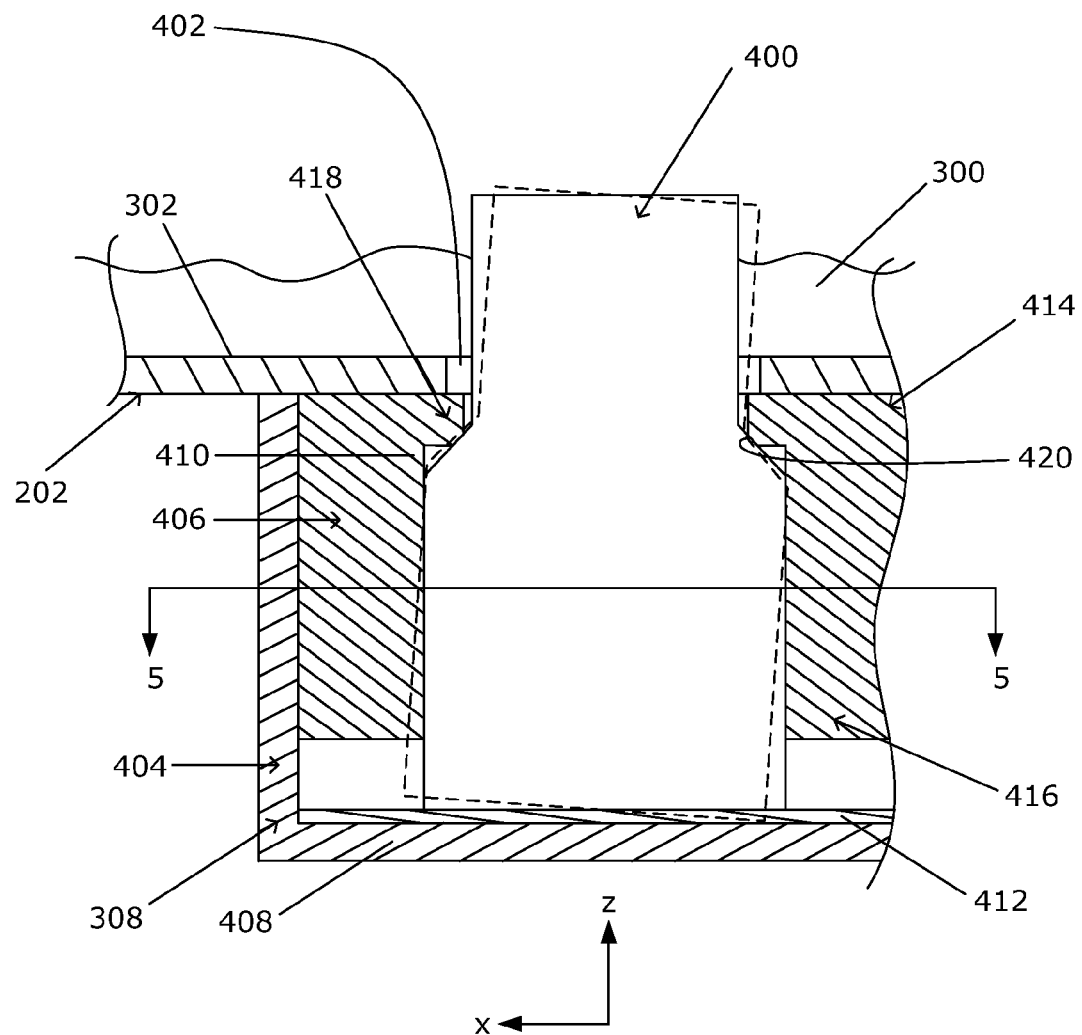
FIG. 4 is a front sectional view of portions of the dock of FIG. 2.

Referring also to FIG. 4, the connector support assembly 308 receives a connector 400. The connector 400 may be a charging connector, a data connector or a connector capable of both charging and data transfer. The connector 400 may support an electrical connection, an optical connection or a combination thereof. A connecting portion of the connector 400 extends through an aperture 402, which is located in the seat 302. When the portable electronic device 100 is received in the dock 150, the connector 400 electrically or optically communicates with the portable electronic device 100 to charge the portable electronic device 100 and/or provide a data connection thereto. In general, the portable electronic device 100 is received in the dock 150 when the portable electronic device 100 is generally supported thereby. Similarly, a first component may be received in a second component when the first component is supported by the second component. The first component may or may not be coupled to the second component and may move relative to the second component.

The connector support assembly 308 includes a support 404, a spring component 406, which is received in the support 404, and a flexible pad 412, which is located on a base 408 of the support 404. The base 408 of the support 404 limits movement of the connector 400 in a z-direction to facilitate coupling with a mating connector of the portable electronic device 100. An opening (not shown) is provided in the support 404 to allow wiring (such as electrical conductors or optical cables, not shown) of the connector 400 to pass therethrough.

Figure 5:
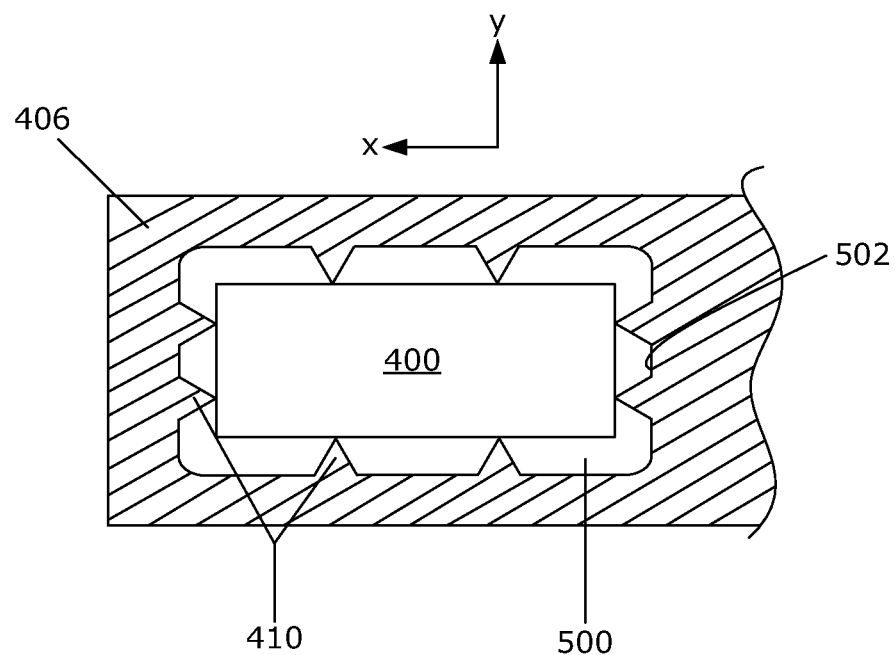
FIG. 5 is a top sectional view on 5-5 of FIG. 4 of portions of the dock of FIG. 2.

The spring component 406 includes a passage 500, which is shown in FIG. 5, for receiving the connector 400. The passage 500 extends between a top end 414 of the spring component 406 and a bottom end 416 of the spring component 406. A collar 418 is located at the top end 414 of the spring component 406 and ribs 410 extend from an inner wall 502 of the passage 500. The collar 418 includes a contact surface 420, which abuts the connector 400 to limit translation of the connector 400 in the x and y directions. The collar 418 may fully or partially surround the connector 400.

The ribs 410 extend vertically relative to the passage 500 and are elastically deformable to accommodate movement of the connector 400. The ribs 410 contact the connector 400 in order to maintain the connector 400 in a starting position within the passage 500. The spring component 406 is biased toward the starting position, which is a non-deformed shape shown in FIG. 5. Any non-axial movement of the connector 400 may cause the ribs 410 of the spring component 406 to elastically deform. An amount of movement of the connector 400 relative to the connector support assembly 308 may be determined by one of both of a rigidity of the ribs 410 and a size of the aperture 402.

The pad 412 is elastically deformable to accommodate some movement of the connector 400 in the z direction. Movement may occur in response to a force applied in the z-axis or pivoting of the connector 400. The pad 412 may be interference fit with the connector 400 to bias the connector 400 toward the mating connector of the portable electronic device 100 and absorb tolerances. The pad 412 is biased toward a non-deformed shape, as shown in FIG. 4.

The spring component 406 is made from a flexible material such as silicone rubber, urethane rubber or cork, for example. A hard plastic having flexible fingers may alternatively be used. The spring component 406 may fully surround the connector 400, as shown in FIG. 5, or may partially surround the connector 400. The spring component 406 may include a different number of ribs than shown in the figures. Further, the spring component may be any spring component that allows movement of the connector 400 relative to the connector support assembly 308 and biases the connector 400 to the starting position within aperture 402.

In operation, a user visually and/or tactilely aligns a mating connector of the portable electronic device 100 with the connector 400 of the dock 150 and then moves the mating connector into engagement with the connector 400. When the mating connector is misaligned with the connector 400 in the x and/or y directions, a force is imparted on the connector 400 by the portable electronic device 100. The ribs 410 of the spring component 406 and the pad 412 elastically deform in order to accommodate pivoting of the connector 400 in response to the force. An example of a pivoted position of the connector 400 is shown in dashed lines in FIG. 4. Multiple forces may be applied to the connector 400 in various different directions while the user attempts to join the connectors of the portable electronic device 100 and dock 150. Because the example dock 150 of FIG. 2 includes a single connector 400, the ribs 410 of the spring component 406 return the connector 400 and the portable electronic device 100 back to the starting position once the connection with the portable electronic device 100 is complete. For heavy portable electronic devices 100, the ribs 410 may remain in a deformed position until the portable electronic device 100 is removed from the dock 150.

Figure 6A:
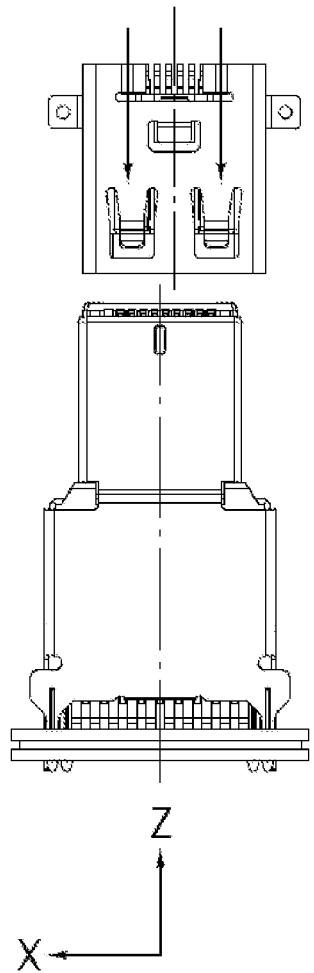
FIGS. 6A and 6B are schematic front views of a mating connector of a portable electronic device misaligned with a connector of a dock.
Figure 6B:
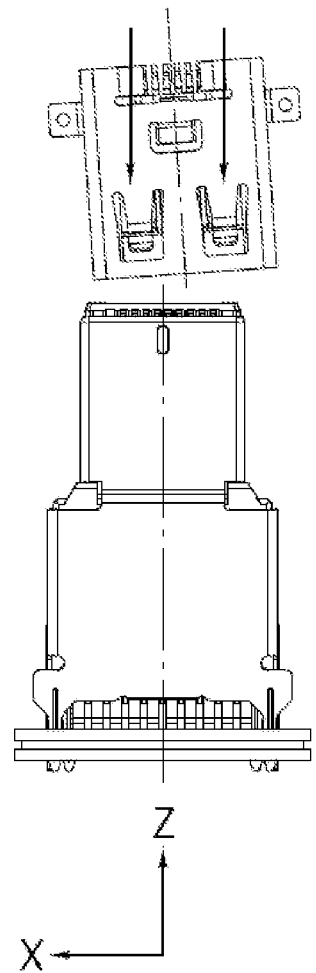

Two examples of misalignment between mating connector of the portable electronic device 100 and the connector 400 are shown in FIGS. 6A and 6B. The dock 150 described herein generally avoids damage to the connector 400 because the force imparted by the mating connector of the portable electronic device 100 is absorbed by the spring component 406 rather than the connector 400.

The connector support assembly 308 may be any support that is coupled to the housing 200 and includes a portion that elastically deforms in response to movement of the connector 400. In addition, an alignment component may be provided to facilitate location of the mating connector of the portable electronic device 100 relative to the connector 400. The alignment component may be a rail, pin or slot, for example, for guiding the portable electronic device 100 into position.

Figure 7:
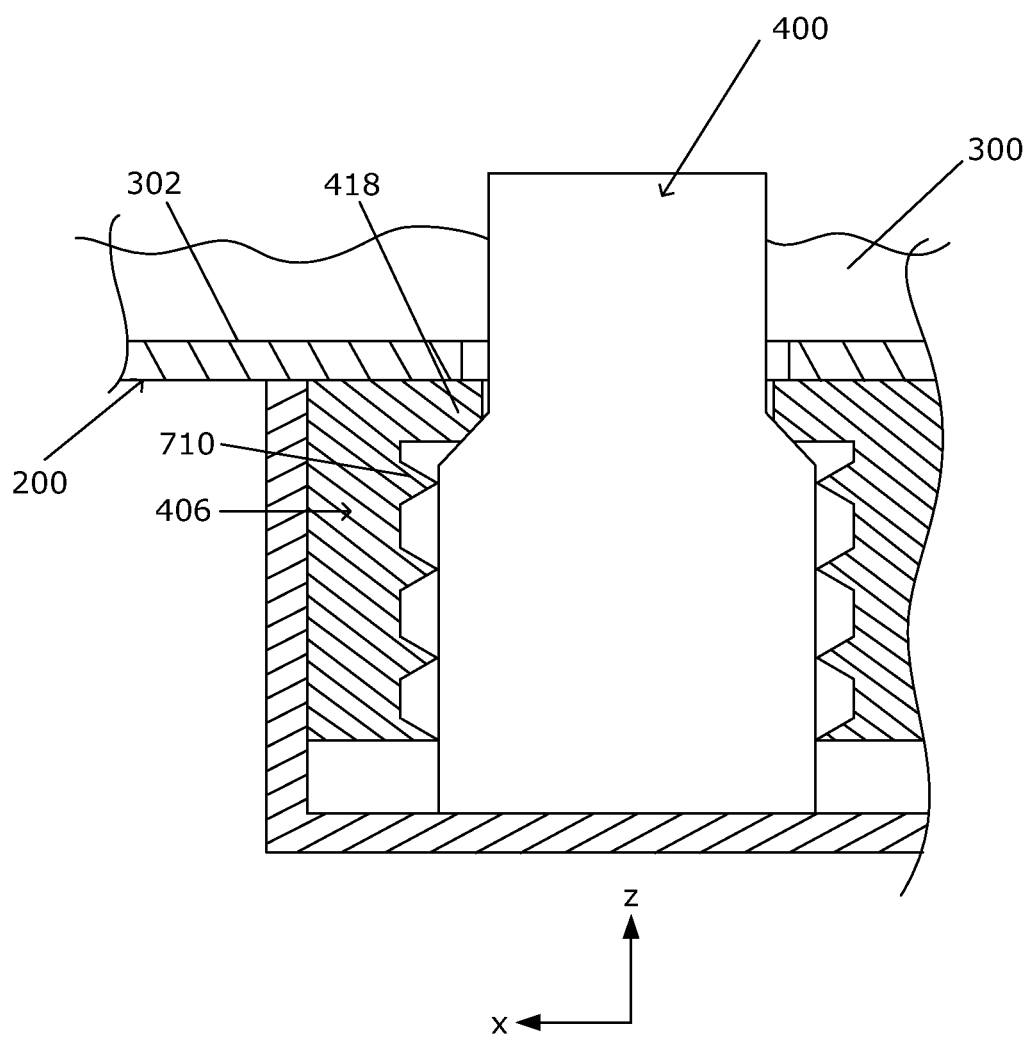
FIG. 7 is a front sectional view of portions of a dock according to another example.

In another example, ribs 710, which are shown in FIG. 7, extend generally horizontally in the spring component 406. The orientation of the ribs may alternatively be disposed at an angle that is between vertical and horizontal.

In another example, the connector extends through an aperture in the support wall or other location in order to accommodate different locations of portable electronic device mating connectors.

Although the collar 418 is shown as part of the spring component 406, the collar 418 may alternatively form part of the seat 302. In another example, the spring component 406 does not include a collar 418. In this embodiment, both translation in the x and y directions and pivoting of the connector 400 relative to the housing 200 are possible.

Figure 8:
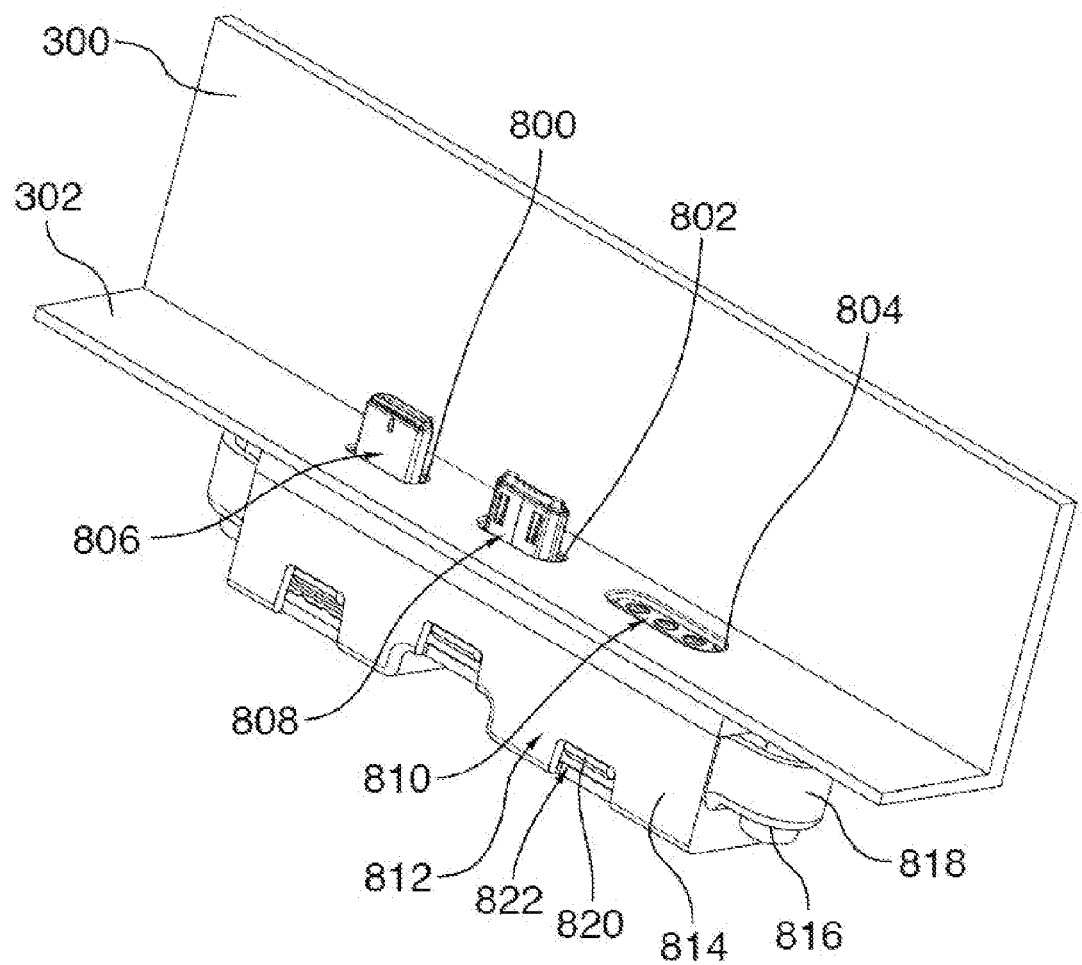
FIG. 8 is an isometric view of a dock according to another example with a charging connector in a stowed position.
Figure 9:
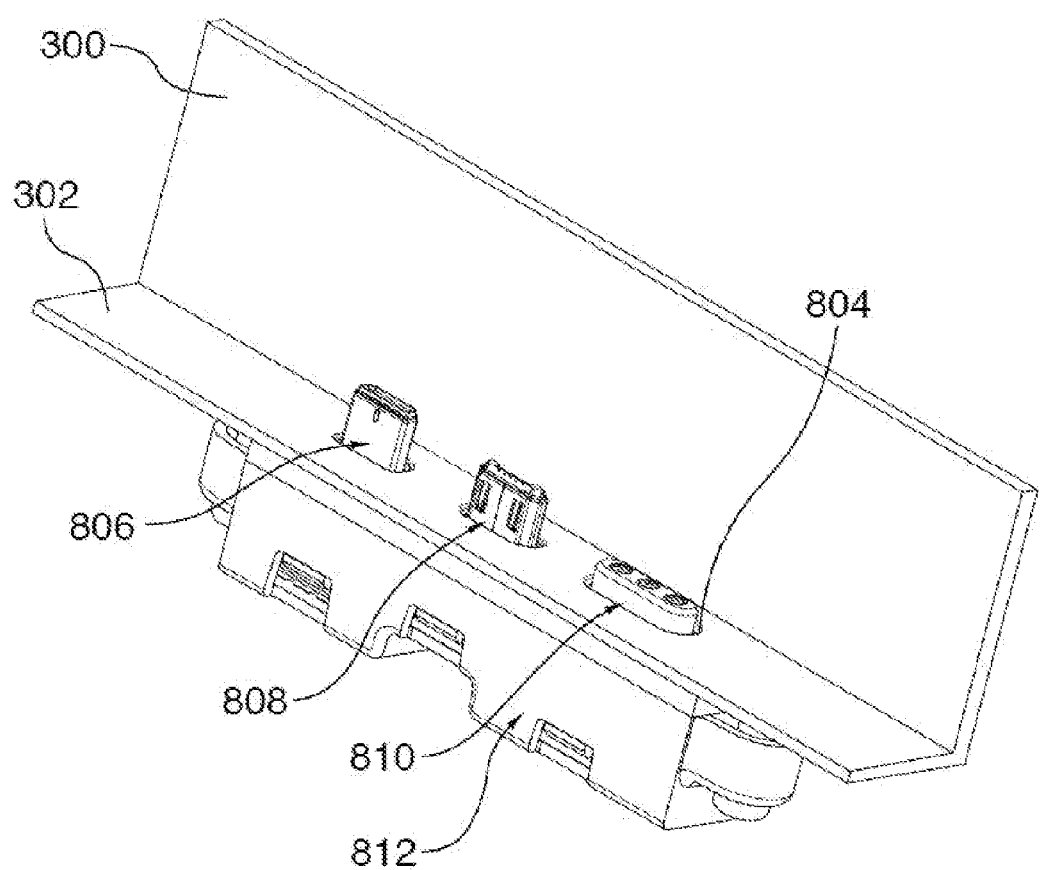
FIG. 9 is an isometric view of the dock of FIG. 8 with a charging connector in an extended position.

Referring now to FIGS. 8 and 9, another example of a dock 150 for a portable electronic device 100 is generally shown. In this example, the dock 150 includes apertures 800, 802, 804, which extend through the seat 302 of the housing 200. First and second data connectors 806 and 808 extend through apertures 800 and 802, respectively. A charging connector 810 extends through the aperture 804. When the portable electronic device 100 is received in the dock 150, the connectors 806, 808, 810 electrically communicate with the portable electronic device 100 to provide data connections and charge the portable electronic device 100. In one example, the first data connector 806 is a micro HDMI connector for transferring data to multimedia devices and the second data connector 808 is a micro USB connector for exchanging data with other electronic devices. Other types of data connectors are also possible. In addition, the charging connector 810 may also transfer data.

Figure 10:
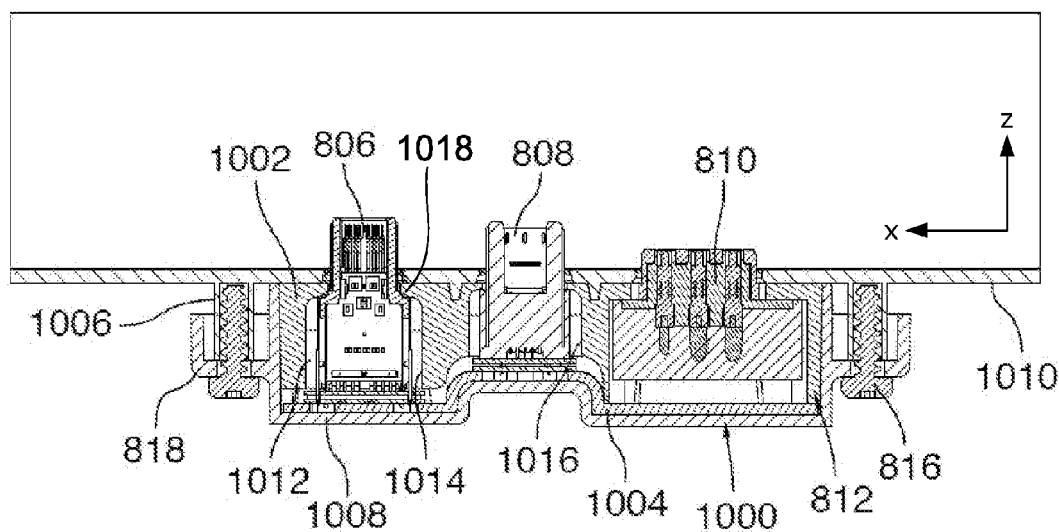
FIG. 10 is a front sectional view of the dock of FIG. 8.

The connectors 806, 808, 810 are mounted in a connector support assembly 812, which is coupled to an inner surface of the housing 200. Referring also to FIG. 10, screws 816 couple lugs 818 of the support assembly 812 to screw-receiving components 1006, which extend from an underside surface 1010 of the seat 302, to couple the support assembly 812 to the housing 200. Other arrangements for coupling the connector support assembly to the housing 200 are also possible.

Referring still to FIGS. 8, 9 and 10, the connector support assembly 812 includes a support tray 1000, a spring component 1002, which is located in the support tray 1000, and a pad 1004, which is disposed between a base 1008 of the support tray 1000 and the spring component 1002. The spring component 1002 includes tabs 820, which mate with openings 822 in a front wall 824 of the support tray 1000 to generally fix the spring component 1002 relative to the support tray 1000. Alternative arrangements for fixing the spring component 1002 in the support tray 1000 are possible including fasteners, such as screws, rivets or staples, glue, or other snap-in fastening arrangements. In addition, the spring component 1002 may be sized so that an interference fit is provided between the spring component 1002 and the connectors 806, 808.

Figure 11:
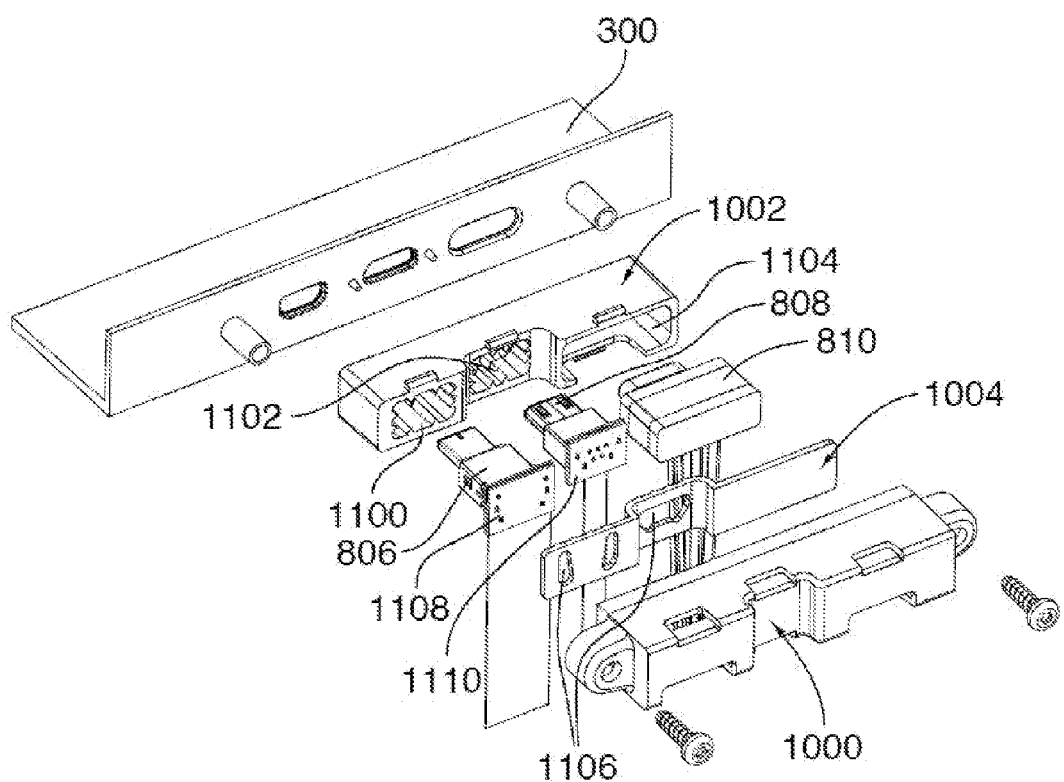
FIG. 11 is an exploded view of the dock of FIG. 8.
Figure 12:
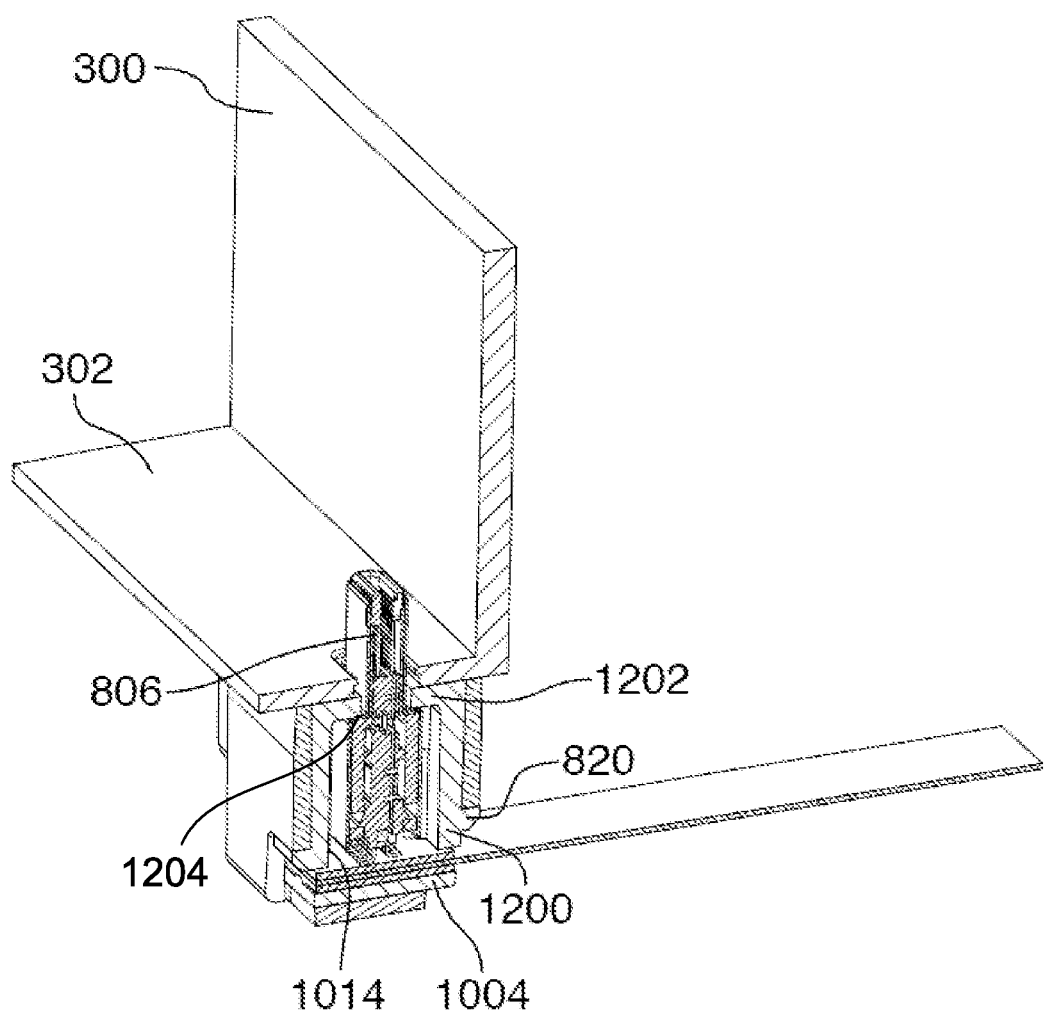
FIG. 12 is an isometric side sectional view of the dock of FIG. 8.

The spring component 1002 includes passages 1100, 1102 and 1104, which are shown in FIG. 11. The passages 1100, 1102, 1104 extend between a bottom end 1200 of the spring component 1002 to a top end 1202. The passages 1100, 1102 and 1104 receive first and second data connectors 806, 808 and charging connector 810, respectively. The charging connector 810 is movable in the z direction through the passage 1104 between a stowed position, which is shown in FIG. 8, and an extended position, which is shown in FIG. 9. The charging connector 810 is generally a floating connector that is biased toward the stowed position and moveable under a magnetic force to the extended position. Passage 1104, which receives the charging connector 810 and allows the charging connector 810 to slide relative thereto.

Collars 1018 are located at the top end 1202 of the spring component 1002 to surround the passages 1100, 1102 and ribs 1012 extend from inner walls 1014 of the passages 1100, 1102. Contact surfaces 1204 of the collars 1018 abut the connectors 806, 808 to limit translation of the connectors 806, 808 in the x and y directions. The collars 1018 may fully or partially surround the connectors 806, 808.

Figure 13:
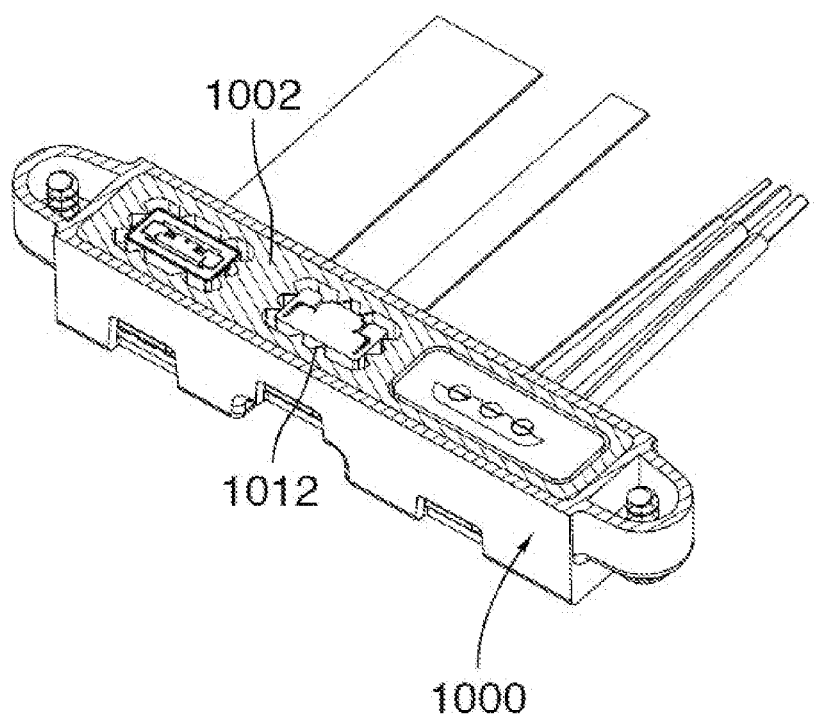
FIG. 13 is an isometric top sectional view of the dock of FIG. 8.

Ribs 1012 extend from inner walls 1014 and 1016 of passages 1100 and 1102 of the spring component 1002, respectively. The ribs 1012 contact the first and second data connectors 806, 808 in order to maintain the connectors 806, 808 in a starting position within the respective passages 1100, 1102. The spring component 1002 is biased toward a non-deformed shape, which is shown in FIG. 13, or a slightly deformed state in which some deformation may occur in response to interference with the connectors 806, 808. An amount of movement of the connectors 806, 808 relative to the connector support assembly 812 may be determined by one of both of a rigidity of the spring component 1002 and a size of the apertures 800 and 802, respectively. The spring component 1002 facilitates independent movement of the connectors 806, 808, 810. Elastic deformation due to a force being applied to one of the connectors is not transferred to the other connectors through the spring component 1002.

The spring component 406 is made from a flexible material such as silicone rubber, urethane rubber or cork, for example. A hard plastic having flexible fingers may alternatively be used.

Because the mating connectors of the portable electronic device 100 are fixed relative to one another, additive tolerances may result in displacements in mating connector locations when compared to manufacturing specifications of the portable electronic device 100. Additive tolerances are generally the sum of internal tolerances of each mating connector component, tolerances of components coupled the mating connector components and assembly process tolerances. The connector support assembly 812 compensates for the additive tolerances of the mating connectors of the portable electronic device 100 by providing a spring component 1002 that allows connectors 806, 808 of the dock 150 to pivot in order to align with the mating connectors of the portable electronic device 100. Because the connectors 806, 808 are not fixed relative to the dock 150, manufacturing of the dock 150 may be simplified because tolerances relating to connector location within the dock 150 may be relaxed compared to fixed connector docks.

The base 1008 of the support tray 1000 limits movement of the connectors 806, 808 in the z-direction to facilitate coupling with mating connectors of the portable electronic device 100. The pad 1004 is elastically deformable to accommodate some movement of the connectors 806 and 808 in the z direction. The pad 1004 may be interference fit with the connectors 806, 808 to bias the connectors 806, 808 toward the mating connectors of the portable electronic device 100 and absorb tolerances. The pad 1004 is biased toward a non-deformed shape, which is shown in FIG. 10, and is compressible in response to a downward, or axial, force on the connector 806, 808. In one example, the pad 804 is two-shot or overmolded onto the support tray 1000 to reduce the part count of the dock 150.

As shown in FIG. 11, apertures 1106 extend through the pad 1004. Referring also to FIG. 10, the apertures 1106 are aligned with the through-hole leads of the connectors 806, 808, which protrude through an opposite surface of printed circuit boards (PCB), 1108, 1110 of the first and second data connectors 806, 808, respectively. The apertures 1106 generally protect the leads and solder joints of the PCB 1108, 1110 from stress during assembly and use when the portable electronic device 100 is inserted into and removed from the dock 150.

Figure 14:
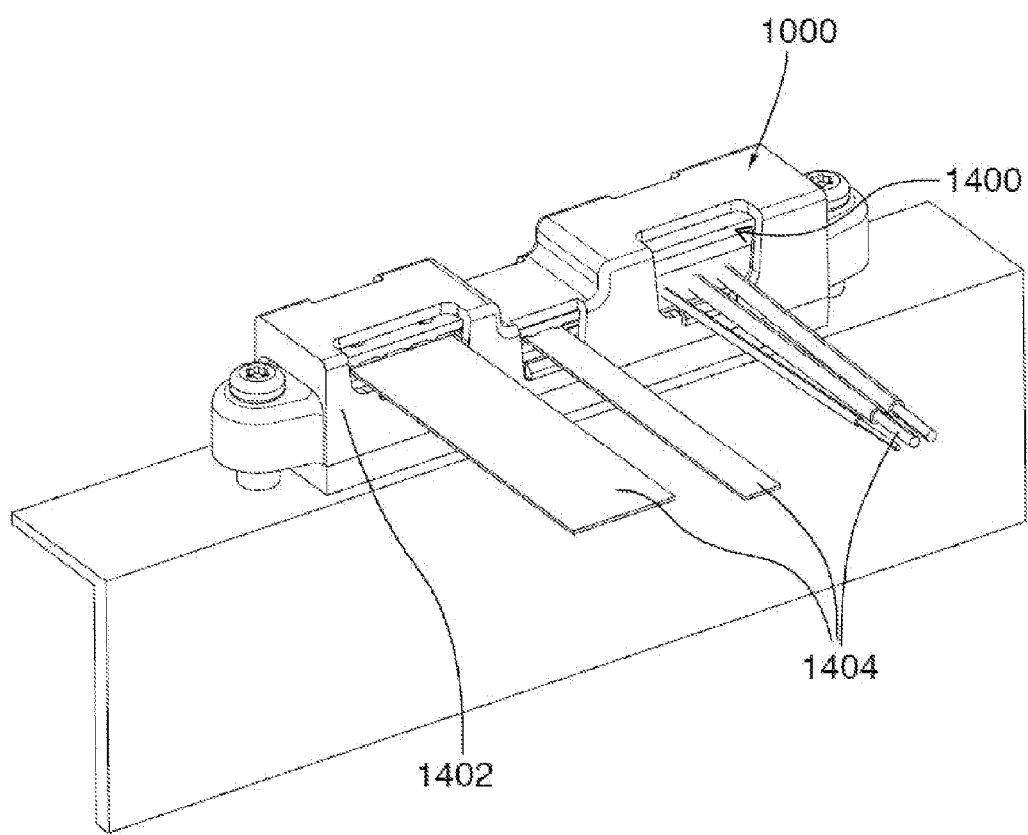
FIG. 14 is an isometric rear bottom view of the dock of FIG. 8.
Figure 15:
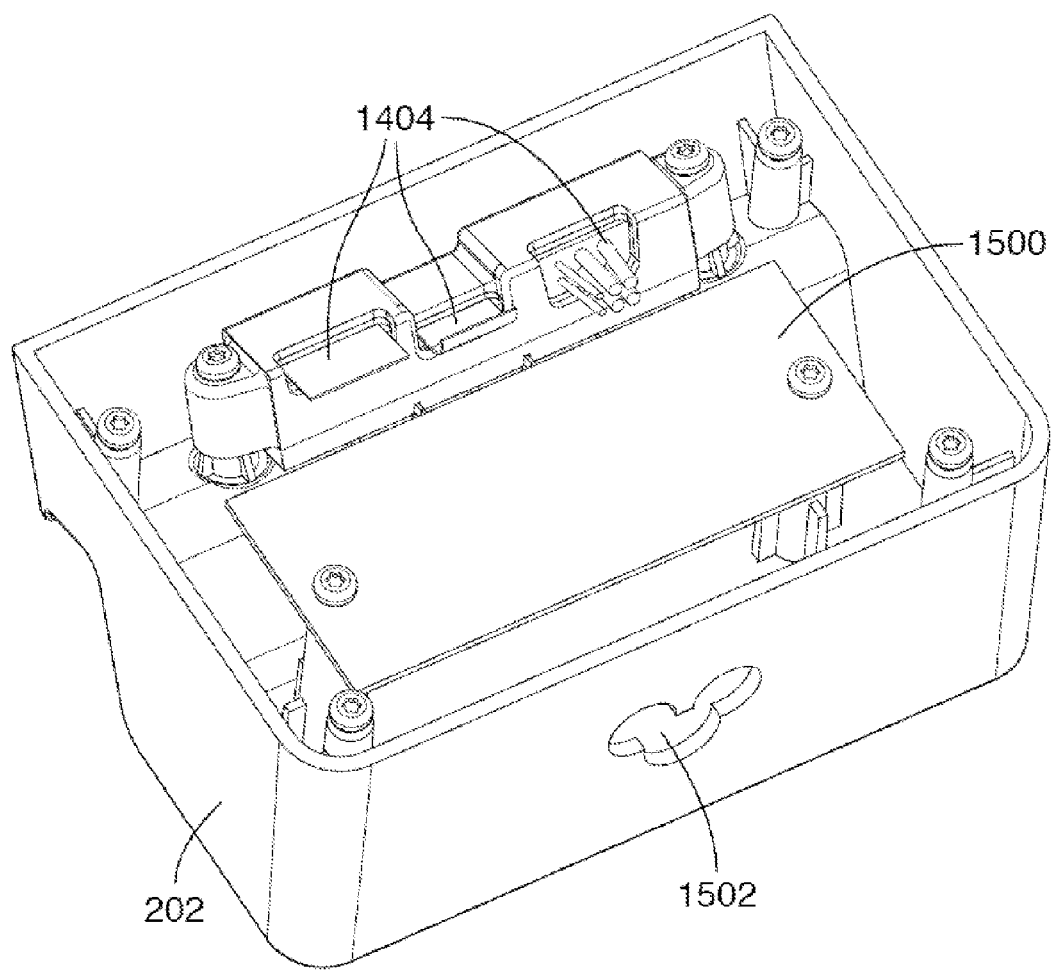
FIG. 15 is an isometric view similar to FIG. 14 including additional components of the dock.

Referring also to FIG. 14, the support tray 1000 includes openings 1400, which extend through a rear wall 1402 of the support tray 1000 to allow wiring 1404 of the connectors 806, 808, 810 to extend therethrough. The wiring 1404 may be flexible cables coupled between the connectors 606, 608, 610 and an electronic device (not shown), a multimedia device (not shown) and a power source (not shown), respectively. In one example, the flexible cables are coupled to a connector (not shown) that is mounted on a main PCB 1500 coupled inside the housing 200, as shown in FIG. 15. The flexible cables may alternatively be soldered to the main PCB 1500. When a main PCB is not included, the flexible cables may be soldered, crimped or inserted into mating pins of one or more connectors. Cables for electrically communicating with the electronic device, multimedia device and power source may extend through opening 1502.

In operation, a user visually and/or tactilely aligns mating connectors of the portable electronic device 100 with the connectors 806, 808 and 810 of the dock 150 and then moves the mating connectors into engagement with the connectors 806, 808, 810. When the mating connectors are not aligned with the connectors 806, 808 in the x and/or y directions, a force is imparted on one or both of the connectors 806, 808 by the portable electronic device 100. The ribs 1012 of the spring component 1002 and the pad 1004 elastically deform in order to accommodate pivoting of the one or both of the connectors 806, 808 in response to the force. Multiple forces may be applied to the connectors 806, 808 in various different directions while the user attempts to join the connectors of the portable electronic device 100 and dock 150. The charging connector 810 moves toward the mating charging connector of the portable electronic device 100 when the magnet of the mating charging connector is near the charging connector 810. Once connected, the connectors 806, 808 may return to the their starting positions or one or both of the connectors 806, 808 may remain out of alignment with the starting position due to additive tolerances of the mating connectors of the portable electronic device 100. Because the connectors 806, 808 are able to pivot in order to align with the mating connectors, additive tolerance issues relating to more than one fixed mating connector are avoided.

Figure 16:
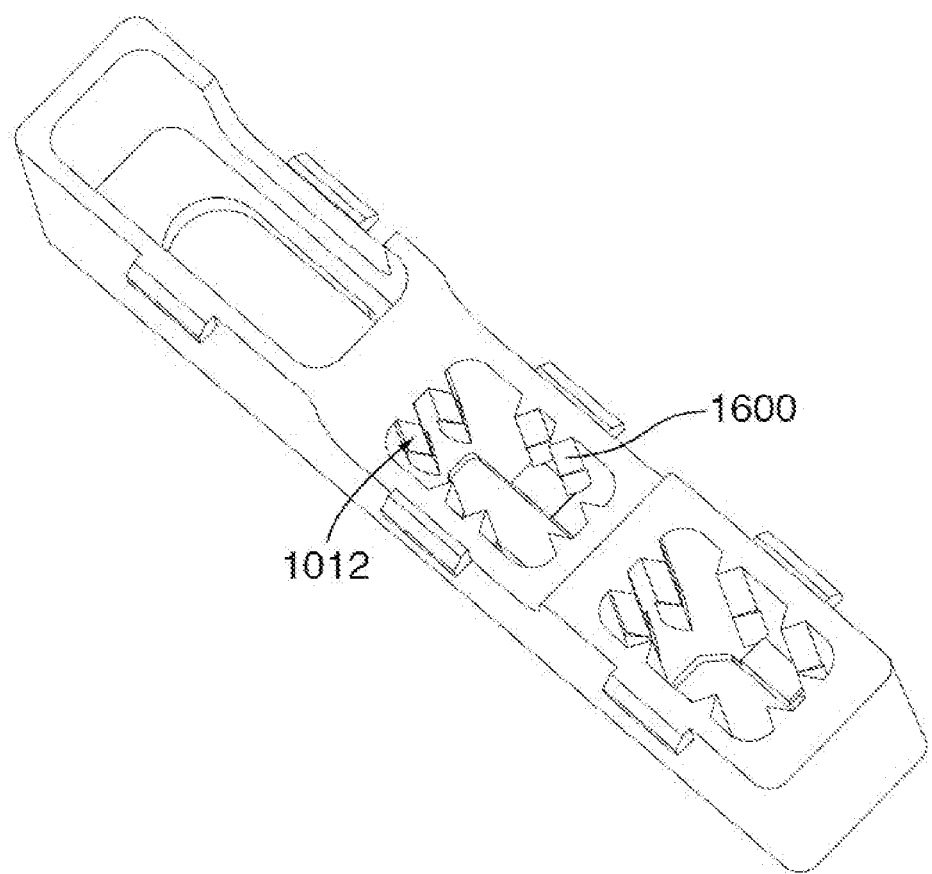
FIG. 16 is an isometric bottom sectional view of a spring component of a dock according to another example.

Referring to FIG. 16, in another example, the ribs 1012 include steps 1600. Two or more steps 1600 are spaced along the length of the ribs 1012 to decrease a rib cross-sectional area between the top end 1202 and a bottom end 1200 of the spring component 1002. When a mating connector of a portable electronic device 100 exerts a force on the connector 806, 808, in the x and/or y direction, a maximum compressive force is applied near the top end 1202 of the spring component 1002. By providing a larger rib cross-sectional area near the top end 1202, the amount of force that is transferred to the bottom end 1200 of the spring component 1002 is reduced. Therefore, damage to solder joints, for example, between the PCBs 1108, 1110 and the connectors 806, 808, respectively, is less likely to occur. Similarly, stress resulting from any shifting, tilting or other alignment forces exerted by the mating connectors of the portable electronic device 100 is reduced.

The charging connector 810 may be replaced with a fixed connector that is mounted within the connector support assembly 812 in a similar manner as data connectors 806 and 808. Further, although three connectors are shown in the example of FIGS. 9 to 15, any number of connectors may be possible.

The connector support assembly and connector(s) may be provided as a single connector assembly that may be mounted in any dock. The connector support assembly may be manufactured to meet specifications associated with docks of different portable electronic devices.

Although the collar 1018 is shown as part of the spring component 1002, the collar 1018 may alternatively form part of the seat 302. In another example, the spring component 1002 does not include a collar 1018. In this example, both translation in the x and y directions and pivoting of the connectors 806, 808 relative to the housing 200 are possible.

The dock 150 described herein may realize one or more advantages, some of which have already been described. The dock 150 facilitates quick and easy connection of a portable electronic device thereto. By compensating for some misalignment between connectors of the dock 150 and mating connectors of the portable electronic device, damage resulting from stress on both the portable electronic device 100 and the dock 150 normally associated with connection and removal operations, may be avoided. Further, the life of the dock 150 may be extended because entry of dust and dirt into the dock 150 is limited by the collar, which may act as a seal.

The above-described embodiments are intended to be examples only. Alterations, modifications and variations can be effected to the particular embodiments by those of skill in the art without departing from the scope of the present application, which is defined solely by the claims appended hereto.

What is claimed is:

1. A dock for receiving a portable electronic device, comprising:
   a housing comprising an aperture;
   a support coupled to an inner wall of the housing, a portion of the support being elastically deformable;
   a connector received in the support and extending through the aperture for electrically communicating with the portable electronic device, wiring of the connector for transferring data from the portable electronic device; and
   a collar abutting the connector within the housing to limit translation of the connector, the connector being pivotable relative to the collar;
   wherein the portion of the support elastically deforms in response to non-axial movement of at least a portion of the connector.

2. A dock as claimed in claim 1, wherein the support includes a spring component received in a support tray, the spring component being elastically deformable.

3. A dock as claimed in claim 2, wherein the spring component comprises a passage for receiving the connector, the passage comprising ribs for contacting the connector.

4. A dock as claimed in claim 2, wherein the spring component biases the connector to a starting position within the passage.

5. A dock as claimed in claim 2, wherein the spring component comprises three passages for receiving a first data connector, a second data connector and a charging connector.

6. A dock as claimed in claim 1, wherein the collar surrounds the connector at a location adjacent the aperture.

7. A dock as claimed in claim 1, comprising more than one connector, each connector being independently movable relative to the housing.

8. A dock as claimed in claim 1, wherein the housing comprises a seat for receiving the portable electronic device and the aperture extends through the seat.

9. A dock as claimed in claim 1, wherein the connector is a micro HDMI connector.

10. A dock as claimed in claim 1, wherein the connector is a micro USB connector and the wiring receives data from an electronic device.

11. A dock as claimed in claim 1, wherein the connector is a charging connector.

12. A dock for receiving a portable electronic device, comprising:
    a housing comprising an aperture;
    a support coupled to an inner wall of the housing, the support comprising a spring component received in a support tray, the spring component comprising a passage for receiving the connector, the passage comprising ribs for contacting the connector, the spring component being elastically deformable in response to non-axial movement of at least a portion of the connector; and
    a connector received in the support and extending through the aperture for electrically communicating with the portable electronic device, wiring of the connector for transferring data from the portable electronic device;
    wherein a cross-sectional area of the ribs is reduced between a top end of the spring component and a bottom end of the spring component, the top end being located adjacent the aperture of the housing.

13. A dock for receiving a portable electronic device, comprising:
    a housing comprising an aperture;
    a support coupled to an inner wall of the housing, a portion of the support being elastically deformable;
    a pad disposed in the support and elastically deformable in response to axial movement of the connector; and
    a connector received in the support and extending through the aperture for electrically communicating with the portable electronic device, wiring of the connector for transferring data from the portable electronic device;
    wherein the portion of the support elastically deforms in response to non-axial movement of at least a portion of the connector.

14. A connector assembly for a dock, the connector assembly comprising:
    a support for coupling to an inner wall the dock, the support comprising a spring component received in a support tray, the spring component comprising a passage, the spring component being elastically deformable; and
    a connector received in the support and extending through the passage for electrically communicating with a portable electronic device received by the dock, wiring of the connector for transferring data from the portable electronic device;
    wherein the passage comprises ribs for contacting the connector and a cross-sectional area of the ribs is reduced between a top end of the spring component and a bottom end of the spring component, the top end being located adjacent the aperture of the housing.

15. A connector assembly for a dock, the connector assembly comprising:
    a support for coupling to an inner wall the dock, the support comprising a collar, a portion of the support being elastically deformable; and
    a connector received in the support for electrically communicating with a portable electronic device received by the dock, wiring of the connector for transferring data from the portable electronic device;
    wherein the portion of the support elastically deforms in response to non-axial translation and pivoting relative to the collar of at least a portion of the connector.

16. A connector assembly as claimed in claim 15, wherein the support includes a spring component received in a support tray, the spring component being elastically deformable.

17. A connector assembly as claimed in claim 16, wherein the spring component comprises a passage for receiving the connector, the passage comprising ribs for contacting the connector.

18. A connector assembly as claimed in claim 15, wherein the spring component biases the connector to a starting position within the passage.

19. A connector assembly as claimed in claim 15, comprising a collar abutting the connector within the housing to limit translation of the connector.

\* \* \* \* \*

UNITED STATES PATENT AND TRADEMARK OFFICE
CERTIFICATE OF CORRECTION

PATENT NO.        : 8,545,247 B2                           Page 1 of 1
APPLICATION NO.   : 13/397486
DATED             : October 1, 2013
INVENTOR(S)       : Leonardo Aldana et al.

It is certified that error appears in the above-identified patent and that said Letters Patent is hereby corrected as shown below:

In the Claims:

Column 9, line 54, claim 4, delete "claim 2" and insert therefor -- claim 3 --.

Signed and Sealed this
Third Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,545,247 B2  Page 1 of 1
APPLICATION NO. : 13/397486
DATED : October 1, 2013
INVENTOR(S) : Leonardo Aldana et al.

It is certified that error appears in the above-identified patent and that said Letters Patent is hereby corrected as shown below:

In the Claims:

Column 11, line 8, claim 18, delete "claim 15" and insert therefor -- claim 17 --

Signed and Sealed this
Twelfth Day of August, 2014

Michelle K. Lee
*Deputy Director of the United States Patent and Trademark Office*